Nov. 29, 1932.  H. RUNTE  1,889,296

SUPPORTING MEANS FOR CONVEYING AND TRANSPORTING VEHICLES

Filed Jan. 25, 1929

H. Runte
INVENTOR

Patented Nov. 29, 1932

1,889,296

UNITED STATES PATENT OFFICE

HERMANN RUNTE, OF LUBECK, GERMANY, ASSIGNOR TO LÜBECKER MASCHINENBAU-GESELLSCHAFT, OF LUBECK, GERMANY

SUPPORTING MEANS FOR CONVEYING AND TRANSPORTING VEHICLES

Application filed January 25, 1929, Serial No. 335,101, and in Germany January 27, 1928.

The present invention relates to improved supporting means for conveying and transporting appliances and other heavy vehicles wherein the weight of the load is transmitted to the truck-frame or the like by three supporting points. In the trucks or vehicles as hitherto constructed the three supporting points are usually disposed to constitute a supporting triangle the location of which is unvariable, so as to not allow of adaptation to different working conditions.

The object of my invention is to provide a supporting system wherein the position of the supporting triangle defined by the three supporting points, can be adjusted or accommodated to the particular working conditions prevailing at a time. With this object in view I provide, between the load and the truck-frame, more than three supporting points which may be selectively combined by threes to form a supporting triangle.

I will now proceed to describe my invention more in detail in connection with the embodiment thereof illustrated somewhat diagrammatically on the accompanying drawing which, however, is in no way intended as a limitation upon the scope of the subjoined claims as it is to be clearly understood that variations and modifications which fairly fall within the true scope of the said claims may be resorted to when found expedient, without departing from the main principle of the invention and without sacrificing its chief advantages.

Figure 1:
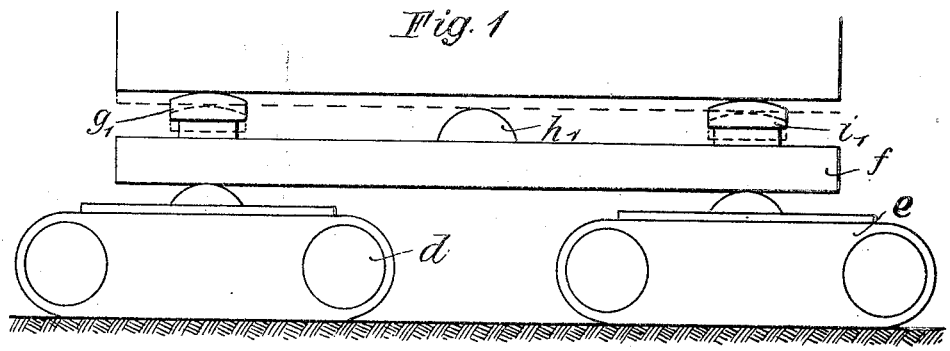
Figure 2:
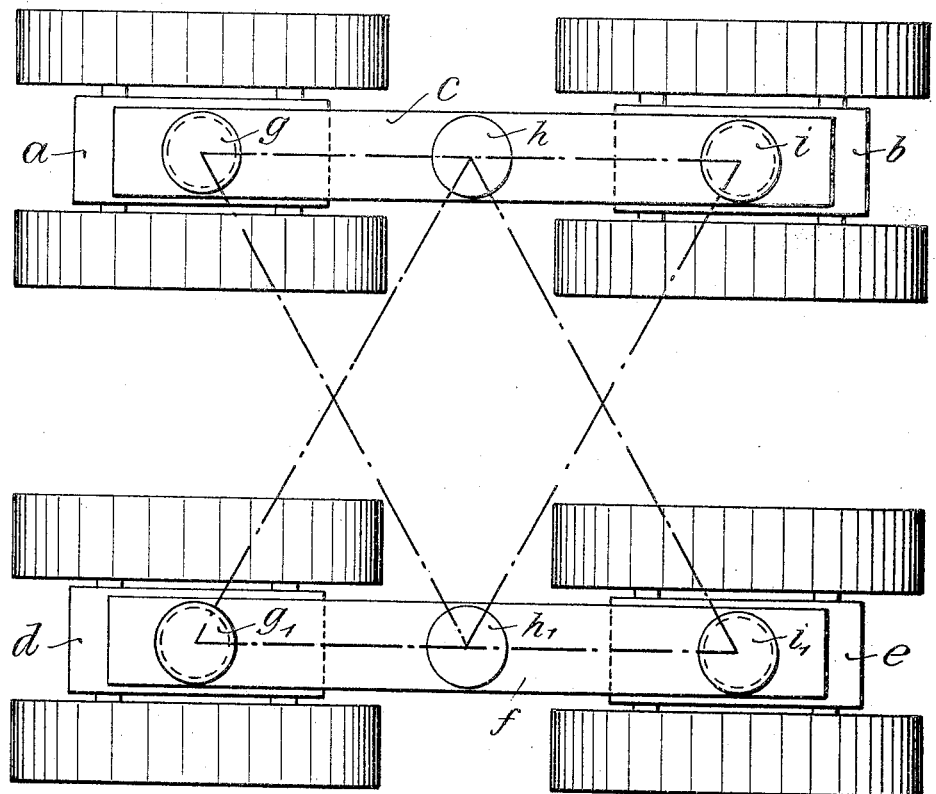
Figures 3, 4:
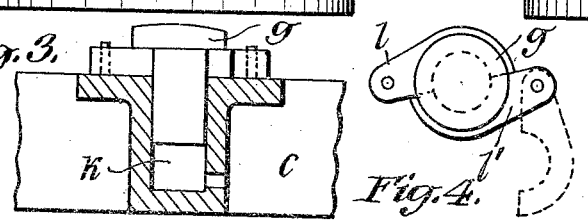

In the accompanying drawing forming a part of this specification and showing, for purposes of exemplification, a preferred form and manner in which the invention may be embodied and practiced, but without limiting the claimed invention to such illustrative instance:

Figure 1 shows in elevation a set of bogie-trucks with supporting means according to the present invention; Figure 2 is a view in top plan of the same; Fig. 3 is an enlarged vertical sectional detail through an adjustable supporting point showing the fixing and locking mechanism and Fig. 4 is a plan view thereof.

The two trucks $a$ and $b$ carry a compensating lever $c$ and the opposite trucks $d$ and $e$ are provided with a similar lever $f$, the lever $c$ having three alined supporting points or domes $g$, $h$ and $i$ and the lever $f$ being correspondingly equipped with three alined supporting points or domes $g'$, $h'$ and $i'$. It will be seen that the two end domes $g$ and $i$ or $g'$ and $i'$, respectively, are of a more complicated construction than the two intermediate domes $h$ and $h'$, because they are adapted to be raised and lowered in pairs, $g$, $i$ and $g'$, $i'$, by means of operating mechanisms comprising threaded spindles, hydraulic pistons or plungers or the like (not shown) and which are universally known in themselves for the purpose in view.

By raising the supporting domes $g$ and $i$ on the one compensating lever $c$ and by lowering at the same time the corresponding supporting domes $g'$ and $i'$ on the opposite compensating lever $f$ or vice versa that side of the supporting triangle which is parallel to the moving direction of the vehicle, can be transferred optionally at any time to the right hand side or the left hand side of the vehicle just as the case may be. The same result can be attained in case that only the two intermediate supporting domes $h$ and $h'$ are arranged and adapted for adjustment in vertical direction for the raising and lowering purpose. Likewise it is feasible to raise the supporting points or domes $g$, $h'$ and $i$ and to thereby bring the truck-frame to horizontal position.

I have not attempted to explain all of the minute details of the construction of the vehicle for it will be understood by those to whom this specification is addressed, that the parts will necessarily be of the proper size and relationship and will be properly mounted and supported according to the tenets of machine construction; nor does it seem necessary to burden this specification with an exposition of the advantages which the invention possesses, for they will be apparent to those skilled in the art to which this invention relates. For instance, a fixing or locking mechanism may be provided at each of the adjustable supporting points for the purpose of relieving such points of the weight of the load after an adjustment has been made. In the arrangement shown in Figs. 3 and 4 the piston $g$ serving as supporting point is adapted to move up and down in the cylinder $k$. The cylinder $k$ is in connection with a hydraulic pressure device (not shown) so that the weighted piston $g$ may also be raised together with the load. In order to relieve the hydraulic pressure device during the operation, the fixing or locking mechanism, Figure 4, is rendered operative. It comprises two parts $l$ and $l'$ which are interposed between the compensating lever $c$ and the projecting edge of the piston $g$. The pressure device may now be relieved and the projecting edge of the piston $g$ bears on the parts $l$ and $l'$. If the piston $g$ is to be lowered, it is slightly raised by means of the pressure device, the parts $l$ and $l'$ are removed by swinging out, and the piston may be lowered until it bears with its projecting edge directly on the compensating lever $c$.

What I claim is:

1. In a vehicle of the character referred to, trucks, a frame for conveying appliances or the like adapted to be supported by said trucks at three points, at least four supporting means disposed between the said trucks and the said frame, and means for selectively raising and lowering said supporting means whereby to form by groups of three a particular supporting triangle while disconnecting the rest of the supporting means.

2. In a vehicle of the character referred to, bogie trucks, a frame adapted to be supported by said trucks at three points, compensating levers connecting said bogie trucks, three supporting means disposed between each of said levers and the said frame, and means for selectively raising one of the intermediate supporting means of one of the levers and the two end supporting means of another of the levers while lowering the other supporting means, and vice versa.

3. In a vehicle of the character referred to as claimed in claim 1, a fixing or locking mechanism adapted to relieve the said means for raising the said supporting means when receiving at a time the pressure or load.

4. In a vehicle of the character referred to as claimed in claim 2, a fixing or locking mechanism adapted to relieve the said means for raising the said supporting means when receiving at a time the pressure or load.

In testimony whereof I have signed my name to this specification.

HERMANN RUNTE.